Aug. 30, 1938.   P. E. FENTON   2,128,640
FASTENER ATTACHING MEANS
Filed May 20, 1937

INVENTOR
Paul E. Fenton,
BY
Mason, Myers & Manley
ATTORNEYS.

Patented Aug. 30, 1938

2,128,640

UNITED STATES PATENT OFFICE 2,128,640

FASTENER ATTACHING MEANS

Paul E. Fenton, Thomaston, Conn., assignor to Scovill Manufacturing Company, Waterbury, Conn., a corporation of Connecticut Application May 20, 1937, Serial No. 143,665

5 Claims. (Cl. 85—37)

This invention relates to improvements in conventional separable fastener installations of the type commonly used on gloves and similar articles for temporarily buttoning one part to another, and in its more particular aspects to improvements in the means for securing the stud and socket members of the installation to their respective supporting sheets of material.

The principal object of the present invention is to produce an inexpensive cap or eyelet part for use in attaching a fastener element or the like to a sheet of supporting material, and one which is capable of cooperating with that element in such manner as to produce a better bond therebetween without materially weakening the intervening sheet. Briefly the invention consists in the provision of an attaching cap having a radial flange for cooperation with a comparable part of the fastener element in compressing the sheet therebetween, and a plurality of arcuately spaced prongs extending perpendicularly from the flange with each such prong folded on its own axis for the purpose of reducing the width thereof, increasing its strength, and increasing the arcuate spacing between it and adjacent prongs.

The full nature of the invention along with other objects and features thereof will be more apparent from the following description when read in connection with the accompanying drawing, in which:—

Figure 1:
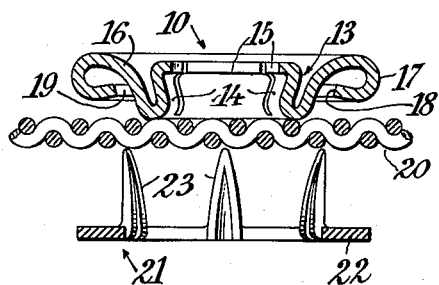
Figure 1 is a sectional view of a fastener element, and of an attaching cap constructed in accordance with the present invention, disposed on opposite sides of an intervening sheet of material.
Figure 3:
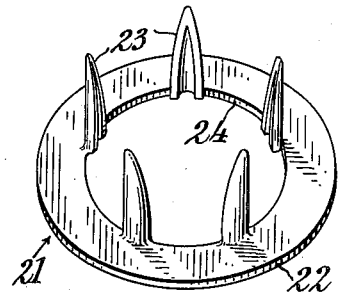
Fig. 3 is a perspective view illustrating the attaching cap of the present invention.
Figure 2:
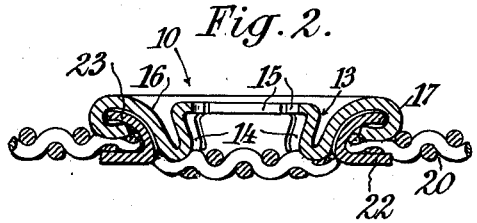
Fig. 2 is a similar view of the parts of Figure 1 secured to the supporting sheet.
Figure 4:
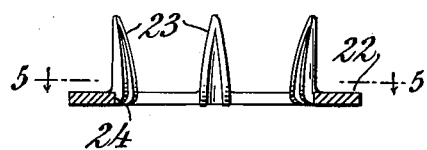
Fig. 4 is a sectional view taken on the line 4—4 of Fig. 5.

Considering the drawing, Figs. 1 and 2 illustrate a separable fastener element 10 of the type with which the present invention is most particularly concerned, that is, one which may be secured to a supporting sheet by a pronged attaching cap. This member, here illustrated as a socket, may be constructed in any desired way, for example, in the manner set forth in Patent No. 2,106,728, issued February 1, 1938. As such it comprises a central cylindrical wall 13 notched at several points along its front lip to form a plurality of somewhat delicate resilient fingers 14 and inwardly rolled along such lip to provide each of the fingers with a stud-engaging bead 15, a breast portion 16 flaring forwardly and outwardly from the rear end of the wall, and a retaining ring 17 rolled rearwardly and inwardly from the outer margin of the breast and terminating with its inwardly-directed edge 18, spaced from the opposing face of the breast to define an annular entrance slot 19. The member, however, so far as the present invention is concerned, might just as well be a stud post constructed in accordance with the teachings of co-pending application, Serial No. 142,125, filed May 12, 1937. Reference may be had either to that application, or to the aforecited patent for a more complete understanding of the constructions there shown, and the advantages to be derived therefrom.

Figure 5:
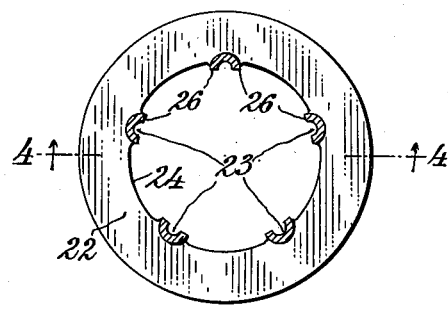
Fig. 5 is a sectional view taken on the line 5—5 of Fig. 4.
Figure 6:
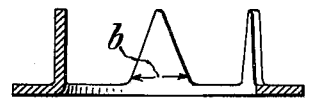
Fig. 6 is a sectinal view of the attaching cap in a partly completed state.

The construction of the attaching cap, or eyelet, 21, is illustrated in Figs. 3, 4, 5 and 6, and there it may be seen to comprise a radial flange 22 having a plurality of arcuately shaped parallel prongs 23 extending perpendicularly away therefrom at spaced points along the base circle 24, the latter being of substantially the same diameter as the entrance slot of the fastener member. Preferably it is made by stamping an appropriate sheet metal blank to form the flange and the prongs, each of the latter being initially flat, in cross-section and, in elevation, triangularly shaped with a relatively wide base $b$; and then turning the prongs outwardly at right angles to the flange, all as shown in Fig. 6. During this stamping operation, or a subsequent one, each prong is folded inwardly upon its own axis, or otherwise arcuated cross-sectionally (Fig. 5), in such fashion as materially to reduce the width of its base portion. Thus, upon completion, it will have the shape of a split cone disposed on the flange with its smooth rounded surface directed outwardly, and its channeled face, and rough inner edges 26, turned inwardly.

The operation wherein the member 10 is attached to its supporting sheet is illustrated generally in Figs. 1 and 2. In that operation the cooperating elements are first disposed on opposite sides of the sheet 20, and the prongs of the cap are then driven through the sheet, and through the annular entrance slot 19, against the flaring breast 16 so as to turn them outwardly into the retaining ring 17, and compress the intervening material between the rear end of the member and the flange of the cap, all in a manner so usual as to require no further description.

Figure 7:
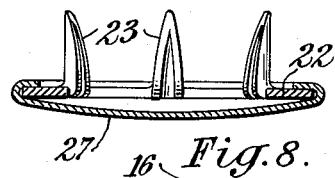
Fig. 7 is a view of a modified form of cap embodying the features of the invention.

With the plain cap of Figs. 1–6, inclusive, it will be noted that a part of the supporting sheet is pushed up through the opening in the flange defined by the base circle 24. If the material is leather, or an attractive fabric, then the exposed portion lends some decorative qualities to the installation; and this, in combination with a simple design embossed or engraved on the flange, is usually sufficient from an artistic point of view. Under certain circumstances, however, the exposed fabric may be considered unsightly. In that event it will usually be found desirable to attach a cap 21, having any desired ornamental characteristics, over the flange 22, as shown in Fig. 7.

Although the above described cap may be used to attach a fastener element to substantially any kind of supporting sheet, its features are such as to make it particularly useful when that sheet is a knitted or woven fabric. In such instance its relatively narrow prongs, as compared with the flat triangularly shaped ones of the prior art, may readily be passed between the threads of the material without cutting them. Then, too, these prongs are substantially as thick as they are wide, and hence will spread crossing threads to substantially the same degree, not as has heretofore been the case, one thread much more than another. Accordingly, the problem of uneven spreading is largely avoided, and with it, the problem of puckering or wrinkling of the material surrounding the installation.

Figure 9:
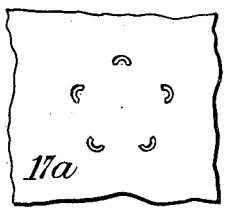
Figs. 9 and 10 are plan views of two pieces of fabric illustrating, respectively, the size of holes cut therein by the prongs of the cap of the present invention, and those formed by prongs of a prior art cap.
Figure 10:
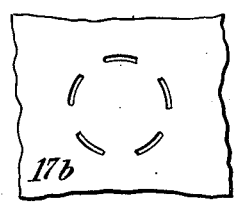

The narrowing of the prongs in the manner set forth has the further effect of increasing the spacing therebetween, as may be seen by a comparison of Figs. 5 and 6. Accordingly, where the new cap is secured to a sheet 17a of leather, rubber or the like, the spacing between the openings cut therein by the prongs (Fig. 9) will be somewhat greater than that between the openings made in the sheet 17b (Fig. 10) by the flat prongs of a prior art cap. While the area of the openings will, in each instance, be the same, the amount of material intervening between them will be much greater in one case than it will in the other. Accordingly, the tendency for the prongs to pull through the fabric of Fig. 9 will be considerably less than that of Fig. 10. Differently stated, the material in the former case will be weakened to a considerably lesser extent than will that of the latter case.

Another advantage, and one which is of some considerable importance, flows from the fact that the arcuation of the prongs stiffens and strengthens them. As compared with the flat, unsupported ones heretofore used, they are not so subject to accidental bending during shipment or the like,—a source of some loss in the past.

Figure 8:
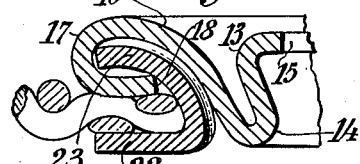
Fig. 8 is a sectional view on an enlarged scale of a fragment of the snap fastener illustration of Fig. 2.

In the described construction it will be noted that each prong is folded inwardly with its relatively rough, sharp edges directed towards the center of the flange. Consequently, during the attaching operation, these edges will engage the breast, and by reason of their roughness, tend to enter into a firmer engagement therewith, that is to say, they will get a better frictional grip on the breast and thus insure a more perfect union between the cooperating parts, as shown most particularly in Fig. 8.

Since certain changes may be made in the construction which are well within the skill of the ordinary mechanic, it is intended that the foregoing shall be considered in a descriptive rather than a limiting sense.

What I claim is:

1. An attaching cap element of the character described, comprising a flange portion, and a plurality of prongs affixed to the flange at spaced points about a base circle on the flange and extending perpendicularly therefrom, each such prong being of generally arcuate cross section on a radius which is very much shorter than that of the base circle whereby to reduce its effective width and increase its rigidity.

2. An attaching cap element according to claim 1, further characterized in that each prong is of generally U-shape cross-section with its relatively rough edges, defining its channeled face, directed inwardly towards the center of the flange.

3. An attaching cap member of the character described, comprising a single piece of sheet metal having a radially-disposed flange portion, and a plurality of triangularly shaped prongs located at arcuately spaced points about a base circle in the flange and extending substantially at right angles therefrom, each prong being folded upon its own axis so that its channeled face is directed inwardly towards the center of the flange, and its width is reduced and its thickness increased to such an extent that these last-mentioned dimensions do not differ materially at a point adjacent its base.

4. An attaching member of the character described, comprising a single piece of sheet metal having a radially-disposed flange portion with a plurality of triangularly shaped prongs located at arcuately spaced points and turned outwardly at right angles to the flange so that all are substantially parallel and lie on a common circle, each such prong being folded along its own axis to such an extent that its relatively rough edges are directed inwardly towards the center of the flange, and its width adjacent its base is materially decreased while its thickness at that point is materially increased.

5. A cap element for use in attaching a fastener member, having a marginal retaining ring, to a supporting sheet, particularly one of woven or knitted fabric, said element comprising a radially disposed flange adapted to engage one surface of such a sheet, and a plurality of pointed prongs joining the flange at arcuately spaced points about a base circle on the flange and extending substantially perpendicularly from such flange so as to pass through such a supporting sheet, each of said prongs being folded upon its own axis with its relatively rough edges directed towards the center of the flange and to such an extent that its thickness adjacent its base approaches its width at that point whereby when passed between crossing threads of the supporting sheet it will spread one thread substantially as much as another.

PAUL E. FENTON.